(12) United States Patent
Gallant et al.

(10) Patent No.: US 9,130,325 B2
(45) Date of Patent: Sep. 8, 2015

(54) CURRENT RETURN NETWORK ELEMENT FOR AN AIRCRAFT

(75) Inventors: Guillaume Gallant, Lareole (FR); Pierre Charon, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 192 days.

(21) Appl. No.: 12/703,855

(22) Filed: Feb. 11, 2010

(65) Prior Publication Data

US 2010/0206986 A1    Aug. 19, 2010

(30) Foreign Application Priority Data

Feb. 11, 2009  (FR) ........................................ 09 50853

(51) Int. Cl.
*B64C 1/18*   (2006.01)
*B64D 45/02*  (2006.01)
*H01R 25/14*  (2006.01)
*H02G 3/38*   (2006.01)

(52) U.S. Cl.
CPC .... *H01R 25/14* (2013.01); *B64C 1/18* (2013.01); *H02G 3/383* (2013.01)

(58) Field of Classification Search
CPC ................................................ H02G 3/383
USPC ................ 244/119, 120, 121, 129.1, 1 A
See application file for complete search history.

(56) References Cited

U.S. PATENT DOCUMENTS

| | | | |
|---|---|---|---|
| 3,781,567 A | 12/1973 | Papsco et al. | |
| 4,755,904 A * | 7/1988 | Brick | 361/117 |
| 5,127,601 A | 7/1992 | Schroeder | |
| 5,670,742 A * | 9/1997 | Jones | 174/384 |
| 5,698,316 A * | 12/1997 | Kuras et al. | 428/344 |
| 7,182,291 B2 * | 2/2007 | Westre et al. | 244/119 |
| 7,351,075 B1 | 4/2008 | Patterson et al. | |
| 7,692,104 B2 | 4/2010 | Charon et al. | |
| 7,883,050 B2 * | 2/2011 | Dufresne et al. | 244/1 A |
| 2005/0213278 A1 | 9/2005 | Hawley | |
| 2007/0253827 A1 | 11/2007 | Dahl et al. | |
| 2008/0232020 A1 | 9/2008 | Dahl et al. | |
| 2008/0251636 A1 | 10/2008 | Soula et al. | |
| 2009/0004480 A1 * | 1/2009 | Dufresne et al. | 428/418 |

FOREIGN PATENT DOCUMENTS

| | | |
|---|---|---|
| FR | 2 905 038 | 2/2008 |
| FR | 2 914 622 | 10/2008 |
| WO | WO 2005/071788 A2 | 8/2005 |

OTHER PUBLICATIONS

Search Report issued Sep. 28, 2009, in French Patent Application No. FA 717983 FR 0950853 with Translation of Category of Cited Documents.

Search Report issued Mar. 8, 2010, in European Patent Application No. EP 10 15 3238 with Translation of Category of Cited Documents.

* cited by examiner

*Primary Examiner* — Brian M O'Hara
(74) *Attorney, Agent, or Firm* — Oblon, McClelland, Maier & Neustadt, L.L.P.

(57) ABSTRACT

A current return network element for aircraft particularly with high conductivity. The purpose is achieved by using a plurality of electrically conducting strips intersecting each other and made from a single piece, at a spacing from each other so as to form a plurality of openings between them.

18 Claims, 4 Drawing Sheets

CURRENT RETURN NETWORK ELEMENT FOR AN AIRCRAFT

TECHNICAL DOMAIN

This invention relates generally to the current return for electrical equipment onboard an aircraft, and more particularly applies to a current return network element for an aircraft.

STATE OF PRIOR ART

The electrical power supply for electrical equipment onboard an aircraft is usually composed of an electric current power supply cable and a current return network through the aircraft structure.

In general, fuselage elements and its primary structure (panels, frames, rails) are made from a metallic material, which enables the formation of an electrical return network to carry functional and fault currents.

However, elements of the fuselage structure are increasingly made of composite materials comprising a mix of fibres and resin to achieve a large mass saving while protecting or improving the mechanical properties of said structural elements.

Since the electrical conductivity of composite materials is poor, structural elements of the fuselage made of composite material can no longer form a current return network.

Thus, it is known that the metallic primary structure of the aircraft floor(s) can be used to form a network, or a network element, or a current return element.

An aircraft floor usually incorporates spars and metallic cross beams assembled by means of metallic junction means.

Therefore, these metallic junction means make a structural junction, and also an electrical junction because they enable electrical continuity between the floor spars and cross beams, thus forming an element of the current return network.

However, electrical continuity is only obtained after a so-called metallisation operation performed during the production cycle.

A corrosion protection paint usually covers metallic parts, and this paint is usually not conducting. Furthermore, an intermediate mastic is often present at the structural junctions between metallic parts to prevent wear phenomena due to contact between said parts.

The metallisation operation, usually done manually, then consists of removing the intermediate mastic and stripping the paint, to locally expose the base metal of the metal part. The junction means may then be mounted on said part at the prepared contact surface.

However, this type of element in the current return network has several disadvantages.

The electrical junction made by junction means is obtained by a manual metallisation operation which may consequently cause several prejudicial imperfections.

Thus, small quantities of mastic or paint trapped between the junction means and the metallic part considered are sufficient to degrade the quality of the electrical contact. This can cause a local temperature increase and therefore premature fatigue of parts, and a local alteration to the electrical conductivity.

Furthermore, the use of add-on junction means makes it necessary to perform a large number of metallisation operations, preferably one for each of said junction means. This manual operation significantly extends the aircraft production cycle. The monitoring and maintenance cycle of each junction is also particularly increased. This necessarily results in high manufacturing and maintenance costs.

PRESENTATION OF THE INVENTION

The main purpose of the invention is to present a current return network element that at least partially overcomes the disadvantages mentioned above that arise with embodiments according to prior art.

To achieve this, the purpose of the invention is a current return network element for an aircraft comprising a plurality of electrically conducting strips intersecting each other and made from a single piece, at a spacing from each other so as to form a plurality of openings between them.

Thus, the current return network element according to the invention includes electrical and structural junctions formed naturally by the intersections of said strips, because the network element that they form is made from a single piece. In other words, by manufacturing said network element in a single piece, said strips intersect without being superposed on each other at the intersections. Therefore, there is no need to provide any add-on means to make the electrical junction between said strips. The risk of the connection between the strips being lost is thus eliminated.

Any degradation to the electrical properties at the junctions, in this case the intersections, is thus eliminated.

The invention also significantly reduces the duration of the production cycle because the metallisation operations described above are no longer necessary. Maintenance times and costs for the line return network are also significantly lower than in prior art described above.

Furthermore, the number of strips may be large so as to form a particularly fine mesh, in order to obtain a highly reliable network element. Unlike prior art, the number of strips and therefore the number of intersections does not increase potential risks of degradation of the electrical properties, nor the duration of production and maintenance cycles.

Furthermore, the geometry of said network element can easily be adapted to the geometry of any part of the aircraft to be fitted with such a network element. For example, the arrangement of intersecting strips and openings may be chosen as a function of the geometry of aircraft elements along which said strips are to be routed.

Each strip is preferably rigid.

Said openings are preferably arranged approximately periodically.

Said intersecting strips are preferably approximately perpendicular to each other, so as to form approximately rectangular or square openings.

Advantageously, the network element is then monolithic. In other words, said strips are made from a single material, which makes the electrical conductivity within said strips practically homogenous. Any abnormally high temperature zones located at the interfaces between the different materials are thus eliminated. Risks of premature fatigue of network element are therefore reduced.

The material may be chosen from among materials with high conductivity, so as to limit the voltage drop along the network element.

Advantageously, the shape of the network element is generally corrugated. A generally corrugated shape means a general shape with or comprising regular or parallel corrugations. The mechanical resistance is then reinforced by the presence of the corrugations.

Preferably, said strips are between 1 mm and 5 mm thick. The thickness is preferably approximately constant along each strip, and approximately identical for all said strips.

Preferably, said strips intersect each other approximately perpendicularly.

The invention also relates to a part of an aircraft comprising at least one current return network element according to any one of the characteristics mentioned above.

According to one embodiment of the invention, said aircraft part comprises a floor comprising a plurality of cross beams, a network element bearing in contact with said cross beams. Thus, said cross beams perform a support or restraining function for said network element. Furthermore, this element can participate in structural reinforcement of said floor.

Said network element may bear in contact with the upper or lower surface of said cross beams.

Said aircraft part may comprise floor rails, said network element being inserted between said rails and said cross beams. Said network element then preferably bears in contact with the upper surface of the cross beams.

Said rails may be seat rails installed on a passenger floor, or freight rails installed on a so-called cargo floor.

Said aircraft part may also comprise at least one electrical power supply cable support, said cable support being mounted on said network element by restraining means. Said network element then preferably bears in contact with the lower surface of the cross beams.

According to another embodiment of the invention, said aircraft part may comprise a fuselage portion comprising a plurality of structural frames, said network element being supported in contact with said frames. Said network element can then participate in structural reinforcement of said fuselage portion.

Other advantages and characteristics of the invention will become clear in the detailed non-limitative description given below.

BRIEF DESCRIPTION OF DRAWINGS

We will now describe embodiments of the invention through non-limitative examples, with reference to the appended drawings among which.

DETAILED PRESENTATION OF PREFERRED EMBODIMENTS

Figure 1:
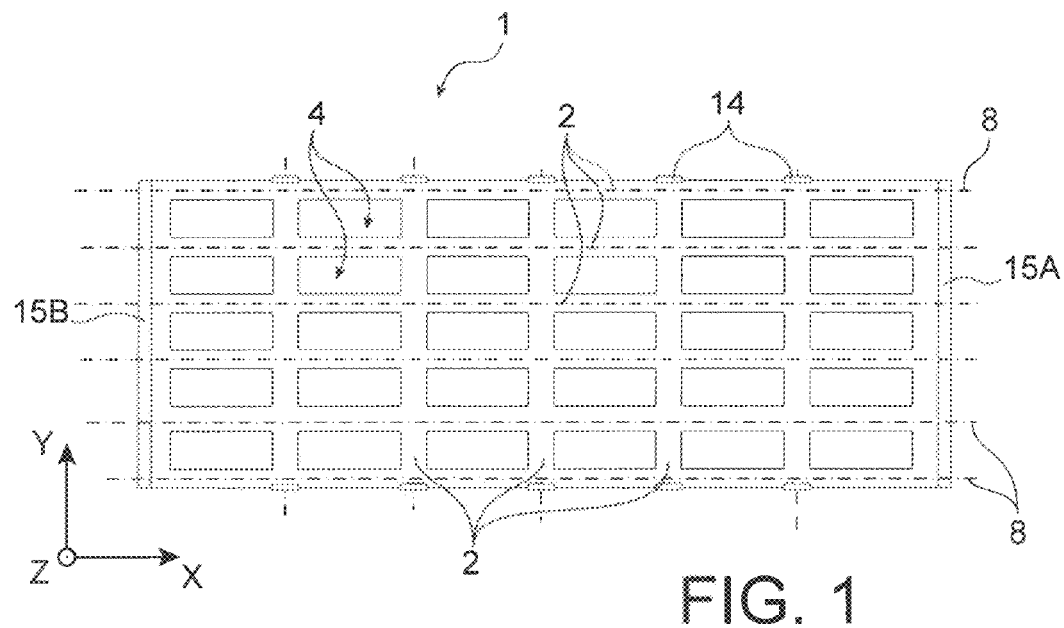
FIG. 1 shows a top view of a current return network element according to the first embodiment of the invention.

The current return network element 1 according to the first preferred embodiment of the invention is shown diagrammatically in FIG. 1, in a top view.

In the following description, by convention, X denotes the longitudinal direction of the aircraft, Y the direction transverse to the aircraft, and Z is the vertical direction, these three directions jointly forming a direct orthogonal coordinate system.

Secondly, the terms « forwards » and « aft » relate to the direction of movement of the aircraft caused by the thrust exerted by the aircraft engines, this direction being approximately along the X direction.

The network element 1 according to the invention comprises a plurality of electrically conducting strips 2 intersecting each other and made in a single piece, at a spacing from each other so as to form a plurality of openings 4 between the strips.

Said strip is a part with a length much greater than its width, for example twice as long.

The thickness of said strips may be less than or equal to its width, and is preferably less.

The thickness may be between 0.5 and 15 millimetres, preferably between 1 and 5 millimetres.

The thickness and width of each strip 2 are approximately constant. The thickness and width are also approximately identical for all said strips 2.

Said strips 2 are electrically conducting, for example they may be made of aluminium or one of its alloys. Preferably, they are made from a material that has sufficient electrical conductivity to enable the current return, while being resistant to corrosion.

Said strips 2 intersect so as to form a mesh, in each intersection 3 forms a node of the mesh. They are at a spacing from each other so as to form a plurality of openings 4 between them. An opening refers to an empty space passing through said network element.

Said openings 4 are arranged approximately periodically, and said strips 2 forming an intersection 3 are approximately perpendicular to each other, so as to form approximately rectangular or square openings 4.

Said strips 2 are made in a single piece, so as to jointly form a single piece. Therefore, no add-on elements are necessary to make the structural junction between said strips. Furthermore, the strips intersect each other without being superposed one above the other at the intersection.

Figure 2:
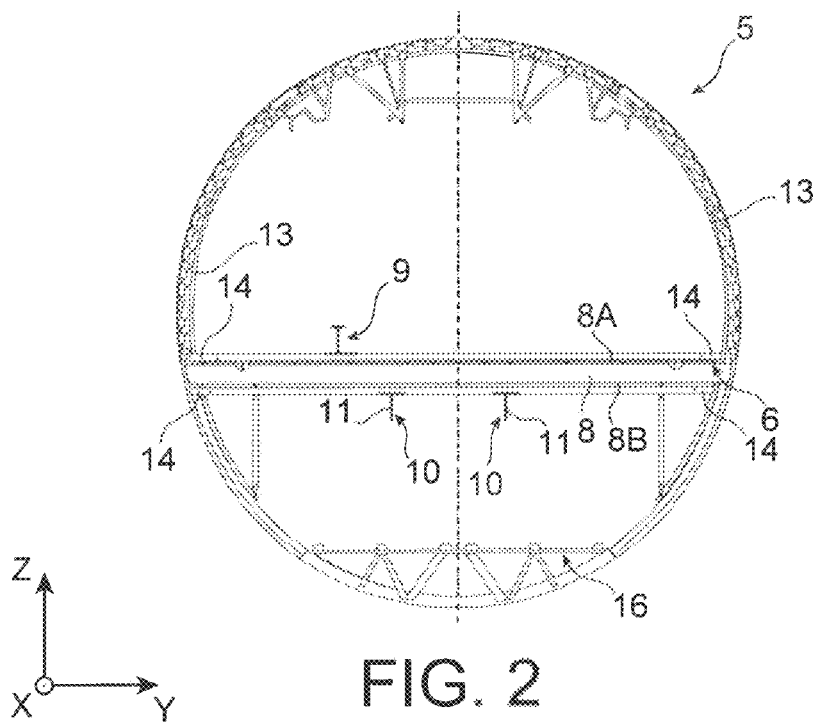
FIG. 2 shows a cross-sectional view of a fuselage segment representing possible means of mounting the current return network element on a passenger floor.

FIG. 2 shows a cross-section through a fuselage 5 comprising a passenger floor 6.

A current return network element 1 like that described above may be installed on the floor 6, more precisely on the primary structure of the floor 6.

Figure 3:
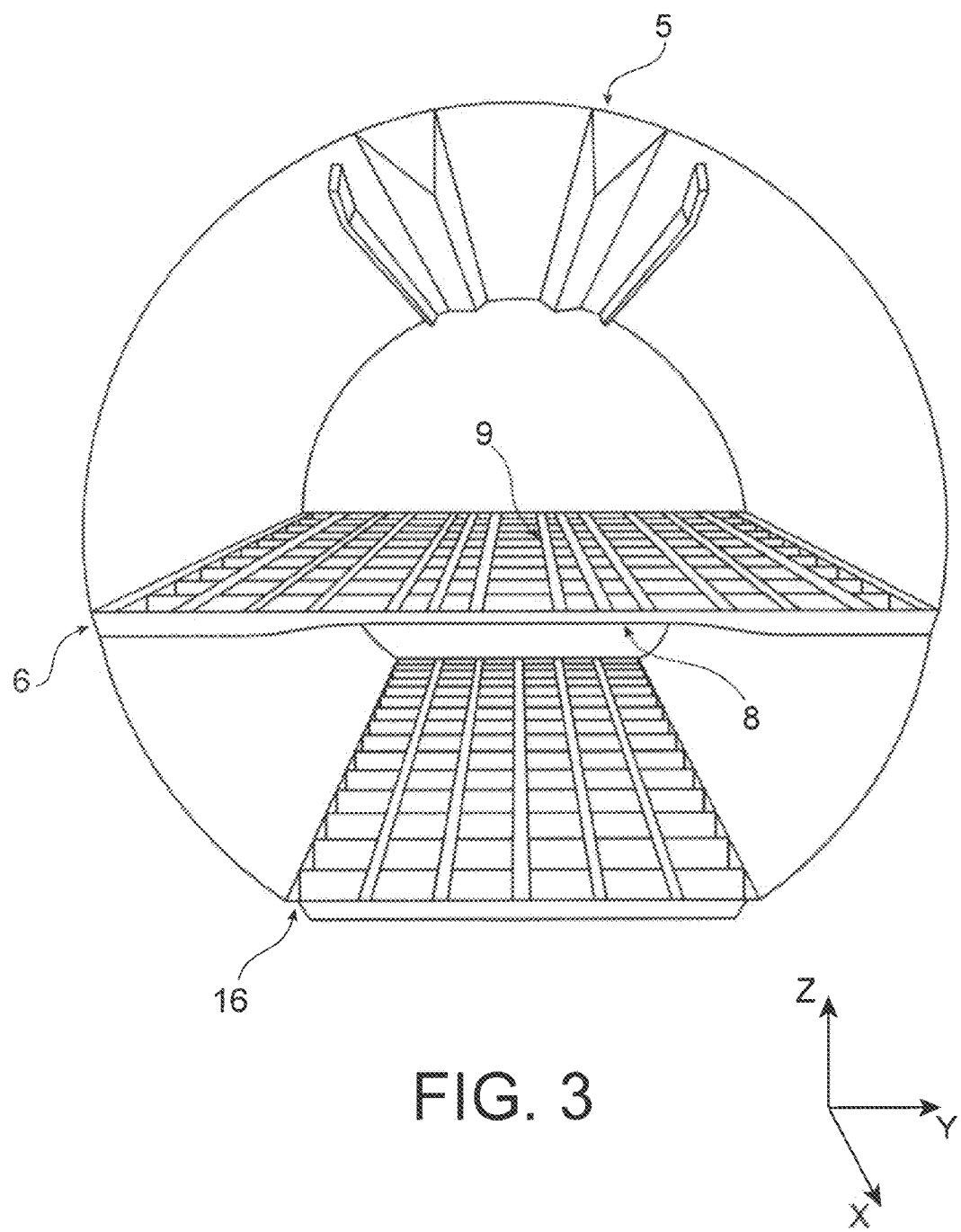
FIG. 3 shows a perspective view of the fuselage segment shown on FIG. 2, more particularly showing the cross beams and floor rails.

As shown in FIG. 3, the primary structure comprises a plurality of spars 7 extending along the longitudinal direction X of the aircraft, and a plurality of cross beams 8 extending along the transverse direction Y.

Generally, each cross beam 8 is made in a single piece and extends along the Y direction over the entire width of the structure of the floor 6.

The cross beams 8 and spars 7 may be made from a metallic or a composite material comprising a mix of fibres and resin.

Note that it is no longer necessary to perform the metallisation operation described above at the junction made by add-on junction means to assembly the cross beams 8 and the spars 7.

Said network element 1 may bear in contact with the upper surface 8A or the lower surface 8B of said cross beams 8.

Direct bearing means arranged in direct or indirect contact with said cross beams 8. An indirect contact may be achieved by means of an intermediate mastic.

The terms « upper » and « lower » should be considered relative to the vertical direction Z of the aircraft.

The network element 1 may be fixed to the cross beams 8 by riveting or bolting, or by lockable connectors.

Preferably, said network element 1 comprises a strip 2 arranged facing said cross beam 8 for each cross beam 8 of the floor, as shown in FIG. 1 in which each dashed line symbolises a cross beam 8. Thus, said strip runs along said cross beam 8 that it is facing.

The number of strips 2 in said network element 1 facing said cross beams 8 may be smaller than the number of cross beams. For example, a strip 2 may be arranged facing a cross beam 8, every two or three or even more cross beams. Said network element 1 then has a lower mass, thus contributing to the general requirement to save mass.

FIGS. 2 and 3 also show metallic rails 9 that can be mounted on the floor structure, for example rails 9 to fix passenger seats (not shown).

The rails 9 usually extend along the longitudinal axis X of the fuselage and are connected to each other through cross beams 8 that extend perpendicular to them.

Said network element 1 is then advantageously intermediate between said rails 9 and said cross beams 8.

Preferably, said network element 1 comprises strips oriented along the longitudinal direction of the rails 9.

Advantageously, a strip 2 is arranged facing each rail 9.

Thus, the strips may run along said rails 9 and other strips of the same network element 1 may run along said cross beams 8.

Advantageously, said rails 9 participate in formation of the current return network by electrically connecting electrical equipment installed at passenger seats to said current return network element 1.

Furthermore, the current return network may comprise a network element 1 bearing on the upper surface 8A of the cross beams 8 and/or a network element 1 bearing in contact with the lower surface 8B of the cross beams 8.

Figure 4A:
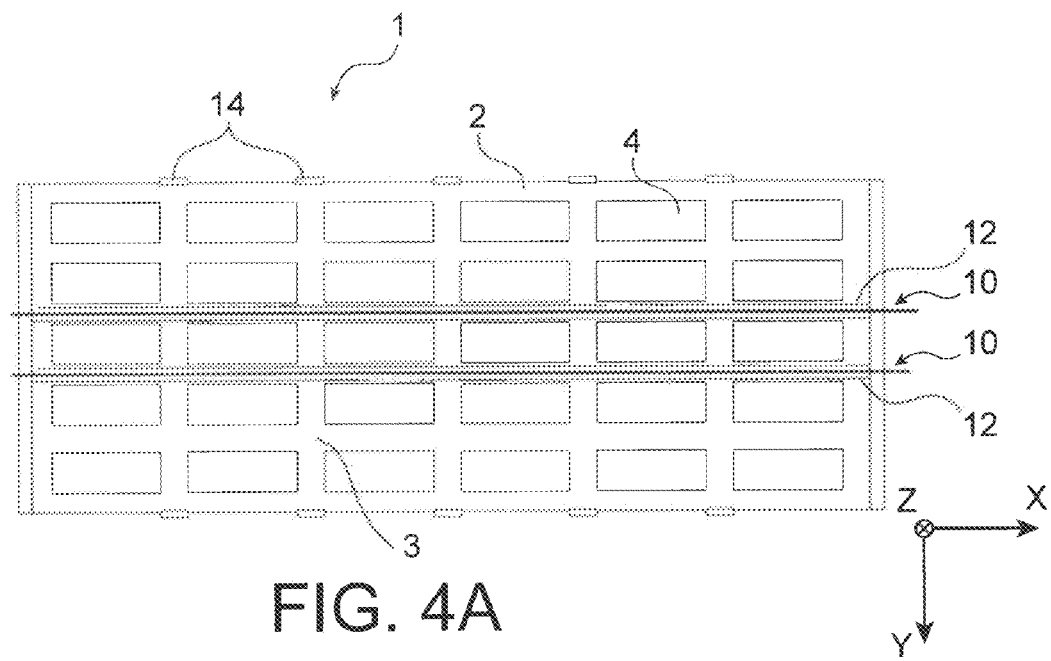
FIG. 4A shows a bottom view of a current return network element according to second embodiment of the invention shown on FIG. 2, comprising means of restraining at least one electrical power supply cable support.

In the case of a network element 1 bearing in contact with the lower surface 8B of the cross beams 8, and as shown in FIGS. 2 and 4A, the supports 10 of the electrical power supply cables as described in patent application FR2905038 deposited in the name of the applicant, may be mounted on said network element 1.

Said electrical cable supports 10 may comprise a metallic shaped body 11 that participates in return of the current circulating in the cables.

Figure 4B:
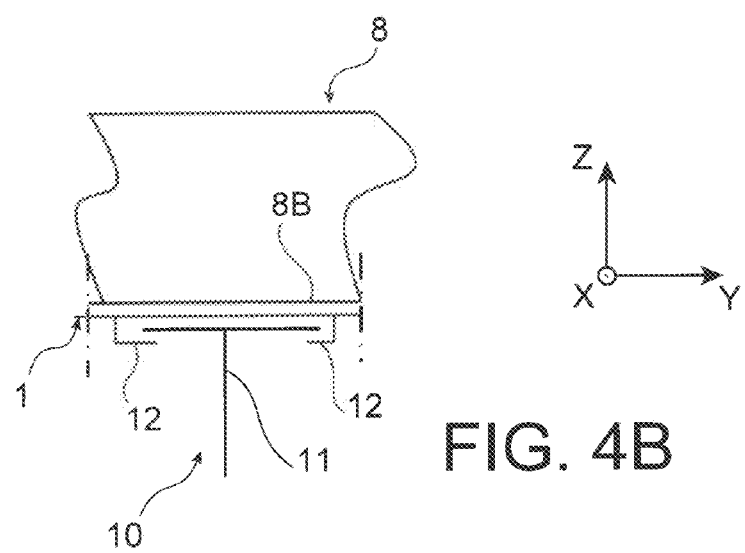
FIG. 4B is an enlarged partial view of a cross-section at plane I-I in FIG. 4A, showing an example of the cable support fixed by said assembly means to the current return network element.

Each cable support 10 may be mounted on said network element by support means 12 (FIG. 4B).

Said support means 12 may be metallic so as to provide electrical continuity with said cable supports 10.

Said supports 10 may also form the harness support, and may participate in protection against the indirect effects of lightning.

These support means 12 may be a pair of U rails 12 welded or fixed to the lower surface of said network element 1, as shown on the FIG. 4B. The two rails 12 are arranged so as to cooperate with the T-shaped body 11 of said cable support 10.

In the example in FIG. 4A, said support means 12 extend continuously along the entire length of said network element 1. Alternately, they may extend discontinuously.

These cable supports 10 may thus improve the structural stiffness of said network element 1.

Preferably, each network element 1 extends along the transverse direction Y over the entire length of the floor 6, regardless of whether it bears on the upper surface 8A or the lower surface 8B of the cross beams 8.

Furthermore, said network element 1 may be mounted on the fuselage structure frames 13 of the aircraft, through attachment means 14 arranged at its side edges as shown on FIGS. 1 and 2. It may be fixed by riveting or bolting, or by lockable connectors.

Provided that these frames 13 are metallic, they may contribute to formation of the current return network and thus cooperate with said current return network element 1.

In general, said network element 1 advantageously has a modular structure, and can thus be arranged along the longitudinal direction X and/or the transverse direction Y of a plurality of successive network elements 1 so as to extend practically over the entire length and/or width of the floor 6.

In the case of an arrangement along the longitudinal direction X, and as shown in FIG. 1, each network element 1 then comprises means 15 of making an electrical junction to achieve electrical continuity between the adjacent network element 1. These electrical junction means 15A, 15B may then be contact zones arranged on the forward part of a first network element 1 and on the aft part of the second consecutive network element 1.

Similarly, in the case of an arrangement along the transverse direction Y (variant not shown), electrical junction means 15 may be provided at the side edges of each network element 1.

Obviously, each network element may comprise electrical junction elements 15 in order to provide a plurality of network elements 1 both along the longitudinal direction X and the transverse direction Y.

Note that although FIG. 2 represents a current return network element mounted on a passenger floor 6, said network element could also be mounted on a so-called cargo floor 16 for freight.

In one embodiment not shown, said network element may bear in contact with a plurality of fuselage frames 13, along a longitudinal portion of the fuselage 5. Thus, while contributing to the stiffness of this fuselage portion, said network element 1 enables a current return from electrical equipment that may be placed in an upper or lower part of the fuselage 1.

Said network element may also have a modular structure as described above.

Finally, the network element 1 may have a generally corrugated shape.

A generally corrugated shape means a general form with or comprising regular and parallel corrugations.

Figure 5:
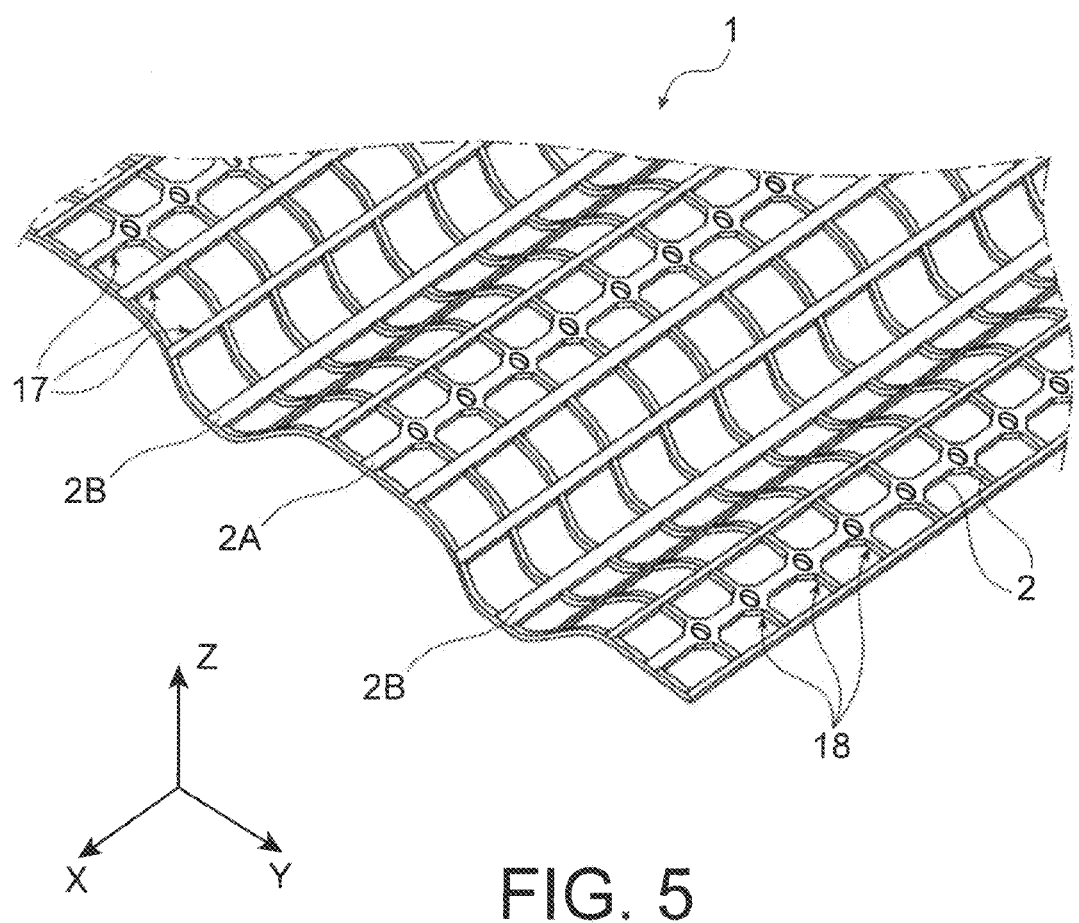
FIG. 5 shows a perspective view of a current return network element with a corrugated general shape.

As shown on FIG. 5, the network element comprises a first plurality 17 of strips 2 extending along a first direction, that intersects with a second plurality 18 of strips 2 extending along a second direction. The intersection and production of said strips in a single piece are identical to what was described above.

The first and second directions in this case are approximately orthogonal and approximately coincident with the longitudinal and transverse directions X and Y respectively. Alternately, the angles between them may have a non-null angle different from 90°.

Each strip 2 of first said plurality 17 extends in an approximately plane manner along the X direction, while each strip 2 of said second plurality 18 extends in a corrugated manner approximately along the Y direction. Thus, strips 2 of said second plurality 18 each comprise a sequence of concave parts and convex parts.

For each corrugation period, said first plurality 17 of strips 2 comprises a strip 2A defining the high peak of the corrugation considered and a strip 2B defining the low peak of said corrugation.

The network element 1 may comprise attachment openings arranged at the intersections between each of the strips 2A and the strips 2 of the second plurality 18. Thus, the network element 1 may for example be mounted on an aircraft floor through strips 2A that bear in contact with the floor as described above. Rivet, bolt or lockable connector mounting means are then arranged through the attachment openings.

The strips 2B do not then bear in contact with the floor, and in particular may be used to restrain the harness.

Note that in this case the general shape of the network element remains approximately plane. All strips 2A in the first plurality 17 are contained approximately in the same plane. Similarly, all strips 2B are contained approximately in the same plane parallel to the plane of the strips 2A.

Alternately, the general shape of the network element 1 may be curved, particularly when it is mounted on a plurality of frames of the fuselage or a portion of the fuselage, as described above. In this case, all strips 2A in the first plurality 17 are largely contained within a single curved surface. Similarly, all strips 2B are largely contained within a single curved surface parallel to the curved surface of the strips 2A.

For each of the embodiments of the network element according to the invention described above, the network element may be made by trimming a corrugated or flat sheet metal plate for example by laser cutting, or using expanded metal.

Obviously, an expert in the subject could make various modifications to the invention as described above simply as a non-limitative example.

The invention claimed is:

1. An aircraft, comprising:
   a current return network element for electrical power supply of electrical equipment onboard an aircraft, the current return network element is in contact with a floor of the aircraft, said current return network element being electrically connected to the electrical equipment aboard the aircraft and includes a single piece provided with a plurality of through openings in such a way that said single piece forms a rigid mesh made from a plurality of rigid electrically conducting strips intersecting each other, and the current return network element has a corrugated shape,
   wherein the corrugated shape is defined by a plurality of periods of high and low peaks of a first set of the plurality of rigid electrically conducting strips aligned with each other in a first direction and defining a uniform overall thickness of the mesh, each of the rigid electrically conducting strips of the first set running from a first side of the current return network element to a second side of the current return network element opposite the first side,
   wherein rigid electrically conducting strips of a second set of the plurality run in a second direction intersecting the first direction, each of the rigid electrically conducting strips of the second set running from a third side of the current return network element to a fourth side of the current return network element opposite the third side,
   wherein each rigid electrically conducting strip of the second set of rigid electrically conducting strips has a shape that runs only in a respective plane in the second direction,
   wherein the first direction is perpendicular to the second direction, and
   wherein the plurality of rigid electrically conducting strips intersecting each other define a plurality of openings, at least two of the openings being different sizes from each other,
   wherein the floor includes a plurality of cross beams and floor rails, said current return network element being in contact with said cross beams, and
   wherein said current return network element is inserted between said floor rails and said cross beams.

2. The aircraft according to claim 1, wherein a thickness of each of said rigid electrically conducting strips is between 1 mm and 5 mm.

3. The aircraft according to claim 1, wherein, for each said period, one rigid electrically conducting strip in the second set defines the high peak and another rigid electrically conducting strip in the second set defines the low peak.

4. The aircraft according to claim 3, wherein, of the rigid electrically conducting strips in the second set, only said rigid electrically conducting strips which define the high peaks include a plurality of attachment openings for attachment to the floor of the aircraft.

5. The aircraft according to claim 4,
   wherein the rigid electrically conducting strips in the second set have a first uniform width except at portions of the mesh defining the attachment openings, and
   wherein the rigid electrically conducting strips in the first set have a second uniform width except at portions of the mesh defining the attachment openings.

6. The aircraft according to claim 1,
   wherein each of the rigid electrically conducting strips of the first set of the plurality of rigid electrically conducting strips, except at the first side and the second side, include a plurality of attachment openings for attachment of the current return network to the floor of the aircraft, and
   wherein a plurality of non-adjacent rigid electrically conducting strips of the second set of the plurality of rigid electrically conducting strips include the plurality of attachment openings.

7. A portion of a fuselage of an aircraft, comprising:
   at least one current return network element for electrical power supply of the electrical equipment onboard the aircraft, the current return network element is in contact with a floor of the aircraft, said current return network element being electrically connected to the electrical equipment aboard the aircraft and includes a single piece provided with a plurality of through openings in such a way that said single piece forms a rigid mesh made from a plurality of rigid electrically conducting strips intersecting each other, and the current return network element has a corrugated shape,
   wherein the corrugated shape is defined by a plurality of periods of high and low peaks of a first set of the plurality of rigid electrically conducting strips aligned with each other in a first direction and defining a constant overall thickness of the mesh, each of the rigid electrically conducting strips of the first set running from a first side of the current return network element to a second side of the current return network element opposite the first side,
   wherein rigid electrically conducting strips of a second set of the plurality run in a second direction intersecting the first direction, each of the rigid electrically conducting strips of the second set running from a third side of the current return network element to a fourth side of the current return network element opposite the third side,
   wherein each rigid electrically conducting strip of the second set of rigid electrically conducting strips has a shape that runs only in a respective plane in the second direction,
   wherein the first direction is perpendicular to the second direction, and
   wherein the plurality of rigid electrically conducting strips intersecting each other define a plurality of openings, a first set of openings being a first size, and a second set of openings being a second size different from the first size, wherein the floor includes a plurality of cross beams and floor rails, said current return network element being in contact with said cross beams, and wherein said current return network element is inserted between said floor rails and said cross beams.

8. The portion of the fuselage of the aircraft according to claim 7, wherein said current return network element is in contact with an upper surface or a lower surface of said cross beams.

9. The portion of the fuselage of the aircraft according to claim 7, further comprising at least one electrical power supply cable support, said cable support being mounted on said current return network element by a restraining device.

10. The portion of the fuselage of the aircraft according to claim 9, wherein the restraining device includes a pair of U-shaped rails.

11. The portion of the fuselage of the aircraft according to claim 9, wherein the at least one electrical power supply cable support is T-shaped.

12. The portion of the fuselage of the aircraft according to claim 7, further comprising a plurality of structural frames, said current return network element being supported in contact with said structural frames.

13. The portion of the fuselage of the aircraft according to claim 7, wherein each said rigid electrically conducting strip of either the first set or the second set of the plurality of rigid electrically conducting strips runs along the cross beam each corresponding rigid electrically conducting strip is facing.

14. The portion of the fuselage of the aircraft according to claim 7, wherein said current return network element is in contact with a lower surface of said cross beams.

15. The portion of the fuselage of the aircraft according to claim 7, wherein, for each said period, one rigid electrically conducting strip in the second set defines the high peak and another rigid electrically conducting strip in the second set defines the low peak.

16. The portion of the fuselage of the aircraft according to claim 15, wherein, of the rigid electrically conducting strips in the second set, only said rigid electrically conducting strips which define the high peaks include a plurality of attachment openings for attachment to the floor of the aircraft.

17. The portion of the fuselage of the aircraft according to claim 16,
wherein the rigid electrically conducting strips in the second set have a first uniform width except at portions of the mesh defining the attachment openings, and
wherein the rigid electrically conducting strips in the first set have a second uniform width except at portions of the mesh defining the attachment openings.

18. The portion of the fuselage of the aircraft according to claim 7,
wherein each of the rigid electrically conducting strips of the first set of the plurality of rigid electrically conducting strips, except at the first side and the second side, include a plurality of attachment openings for attachment of the current return network to the floor of the aircraft, and
wherein a plurality of non-adjacent rigid electrically conducting strips of the second set of the plurality of rigid electrically conducting strips include the plurality of attachment openings.

* * * * *